United States Patent
Proudlock et al.

(10) Patent No.: US 9,730,384 B2
(45) Date of Patent: Aug. 15, 2017

(54) VEGETATION CUTTING DEVICE

(71) Applicant: BLACK & DECKER INC., Newark, DE (US)

(72) Inventors: David Proudlock, Durham (GB); Neil Walmsley, Durham (GB)

(73) Assignee: BLACK & DECKER INC., New Britain, CT (US)

( * ) Notice: Subject to any disclaimer, the term of this patent is extended or adjusted under 35 U.S.C. 154(b) by 692 days.

(21) Appl. No.: 14/062,111

(22) Filed: Oct. 24, 2013

(65) Prior Publication Data

US 2014/0115903 A1    May 1, 2014

(30) Foreign Application Priority Data

Oct. 26, 2012    (EP) .................................... 12190115

(51) Int. Cl.
| | |
|---|---|
| B26B 7/00 | (2006.01) |
| A01D 34/412 | (2006.01) |
| A01D 34/82 | (2006.01) |
| A01D 34/84 | (2006.01) |
| A01D 34/90 | (2006.01) |

(52) U.S. Cl.
CPC ......... *A01D 34/412* (2013.01); *A01D 34/826* (2013.01); *A01D 34/84* (2013.01); *A01D 34/90* (2013.01); *Y10T 83/9495* (2015.04)

(58) Field of Classification Search
CPC ...... A01D 34/092; A01D 34/84; A01D 34/90; A01D 34/412; A01D 34/826
USPC .............................................. 30/276; 56/12.7
See application file for complete search history.

(56) References Cited

U.S. PATENT DOCUMENTS

| | | | |
|---|---|---|---|
| 3,090,186 A | 5/1963 | Dykes et al. | |
| 3,653,447 A | 4/1972 | Stoner | |
| 4,219,972 A * | 9/1980 | Ota .......................... | B24B 5/01 |
| | | | 125/11.01 |
| 5,447,019 A | 9/1995 | Held et al. | |
| 5,551,395 A | 9/1996 | Isaacs et al. | |
| 5,826,667 A | 10/1998 | Notaras et al. | |
| 6,039,024 A | 3/2000 | Carlson | |
| 6,155,035 A | 12/2000 | Merritt, III | |
| 6,408,820 B1 | 6/2002 | LaMarr, Jr. | |
| 6,546,706 B1 | 4/2003 | Nafziger | |
| 6,668,530 B2 | 12/2003 | Kern et al. | |
| 6,779,325 B1 | 8/2004 | Robillard, II | |
| 6,786,030 B2 | 9/2004 | Nafziger | |
| 6,830,204 B1 | 12/2004 | Morey | |
| 6,892,517 B2 | 5/2005 | Adams et al. | |
| 7,370,458 B2 | 5/2008 | Matsuda et al. | |

(Continued)

*Primary Examiner* — Kenneth E. Peterson
*Assistant Examiner* — Samuel A Davies
(74) *Attorney, Agent, or Firm* — John Yun

(57) ABSTRACT

A vegetation cutting device comprising a housing rotatably coupled to a shaft; a cutting head comprising a rotary cutting device for cutting vegetation, the cutting head being coupled to the shaft and being arranged to move between an edging mode in which the rotary cutting device rotates in a substantially horizontal plane; a motor mounted in the housing, the motor being arranged to drive the rotary cutting device; and a switching device mechanically coupled between the housing and the shaft and arranged to be actuated when the shaft rotates relatives to the housing thereby changing the speed of the rotary cutting device when the cutting head moves between the edging mode and trimming mode.

16 Claims, 6 Drawing Sheets

(56) References Cited

U.S. PATENT DOCUMENTS

| | | | |
|---|---|---|---|
| 7,877,971 B1 | 2/2011 | Hallinan et al. | |
| 2002/0007559 A1* | 1/2002 | Morabit | A01D 34/416 30/276 |
| 2002/0070301 A1 | 6/2002 | Stelter et al. | |
| 2007/0247095 A1 | 10/2007 | Machens et al. | |
| 2008/0134522 A1* | 6/2008 | Hurley | A01D 34/4163 30/276 |
| 2008/0141541 A1 | 6/2008 | Hurley | |

* cited by examiner

VEGETATION CUTTING DEVICE

CROSS-REFERENCE TO RELATED APPLICATIONS

This application claims priority to European Patent Application No. 12190115.1 filed Oct. 26, 2012. The entire contents of that application are expressly incorporated herein by reference.

FIELD OF THE INVENTION

The present invention relates to a vegetation cutting device such as a string trimmer.

BACKGROUND OF THE INVENTION

Vegetation cutting devices such as string trimmers are known power operated tools for cutting grass and other foliage and vegetation. Typically string trimmers are powered by petrol or electricity and an engine or motor drives a cutting head. The cutting head can comprise one or more rotating blades, in which case the trimmer is generally known as a brush cutter or one or more rotating lines, in which case it is known as a string trimmer. Many types of vegetation cutting devices, such as string trimmers employ a mechanism for allowing the user of the string trimmer to operate the string trimmer in a horizontal or "trimming" mode and in a vertical or "edging" mode.

When the string trimmer is in a trimming or horizontal mode, the plane of rotation of the cutting head and the cutting line is in a plane which is generally parallel with the ground. This means that the plane of rotation of the cutting lines is in an orientation for trimming grass or other vegetation. Typically grass growing in a lawn can be cut when the string trimmer is in the trimming mode.

In contrast when the string trimmer is in an edging mode, the plane of rotation of the cutting head is in a plane which is generally perpendicular to the ground. This means that the plane of rotation of the cutting lines are in an orientation which is suitable for cutting a line in vegetation. Typically grass at the edge of a lawn growing into a flowerbed can be cut when the string trimmer is in edging mode.

As with most vegetation cutting devices, string trimmers are susceptible to generating substantial noise when in use. The noise generated by a string trimmer in use comes mainly from the cutting line cutting vegetation and the cutting line passing through the air. The amount of noise will depend on a number of characteristics of the string trimmer, such as how fast the cutting lines are rotating, how thick the cutting line is, the length of the cutting line, and the shape of the cutting line. Typically, the greater the volume of air that the cutting line passes through in a unit time, the greater the level noise generated by the string trimmer in use.

The user can also affect the noise level generated by the string trimmer depending on how they use the string trimmer. For example a user attempting to cut dense vegetation may experience more noise than simply trimming the lawn. The orientation of the string trimmer will also affect the level of noise experienced by the user. For example a user can orientate the string trimmer in different positions and also modify the cutting head to cut in trimming or edging modes.

Personal protective equipment such as ear defenders can be used by the user to reduce the noise and prevent damage to the hearing of the user with prolonged use of the string trimmer. However ear defenders are unsightly and cumbersome and many users do not want to wear ear defenders when using a string trimmer. Furthermore a user may even forget to wear ear defenders until they are in the middle of the garden using the string trimmer at which point they cannot be bothered to fetch them.

In order protect the hearing of the user of the string trimmer, known string trimmers are configured to generate a maximum level of noise which does not exceed a certain limit. Typically the limit is determined to be such a level as not to cause damage to the user's hearing. For example the type of line used and the operational speed of the motor may be fixed and the user may not be able to vary these during operation. However in some instances the user may want more flexibility when using the string trimmer.

It is known to vary the speed of the motor of a string trimmer. In some circumstances a speed control dial can be used on a string trimmer. This means that a user can select what speed the motor should operate in. This means that the user can reduce the motor speed to economise power consumption. This can be particularly useful if the string trimmer is a cordless variety because the user can prolong the runtime of the string trimmer on a single battery charge.

DE 29819468 shows an example of a grass trimmer for use in a horizontal mode or vertical mode. In vertical mode the grass trimmer can be used for cleaning crevices. The speed of the string trimmer motor is determined by an electronic speed controller in the grip. This means the user can select the speed of the motor and reduce the speed of the motor when the string trimmer is operated in the vertical mode so stones and the like are less likely to be ejected from the crevices at high speed.

The user can decide to use the aforementioned vegetation cutting devices at a maximum motor speed at any point. Accordingly the vegetation cutting devices are designed to limit the noise generated by the line when rotated at the maximum motor speed for all types of operation.

A vegetation cutting device providing more flexibility for the user during use whilst managing noise levels which are experienced by the user is desirable. Embodiments of the present invention aim to address the aforementioned problems.

SUMMARY OF THE INVENTION

According to an aspect of the present invention there is a vegetation cutting device comprising: a housing rotatably coupled to a shaft; a cutting head comprising a rotary cutting means for cutting vegetation, the cutting head being coupled to the shaft and being arranged to move between an edging mode in which the rotary cutting means rotates in a substantially vertical plane and a trimming mode in which the rotary cutting means rotates in a substantially horizontal plane; a motor mounted in the housing, the motor being arranged to drive the rotary cutting means; and a switching means mechanically coupled between the housing and the shaft and arranged to be actuated when the shaft rotates relative to the housing thereby changing the speed of the rotary cutting means when the cutting head moves between the edging mode and trimming mode.

When the vegetation cutting device is in trimming mode, a guard piece surrounding the cutting line may reflect noise into vegetation being cut and the vegetation will naturally will dampen the noise. In contrast when the vegetation cutting device is in edging mode the guard may reflect the noise into the open air. By determining which mode the cutting head is in, the speed of the motor can be adjusted accordingly. This means that the speed of the motor can be automatically increased when the cutting head is rotated into trimming mode and decreased when the cutting head is rotated into edging mode. This means that the difference in noise levels experienced by the user when the vegetation cutting device is used in trimming mode or in edging mode can be accommodated accordingly.

By reducing the speed of the cutting head in edging mode, the noise level is also reduced in edging mode. The vegetation cutting device can be designed to improve the cutting characteristics whilst keeping the noise below a desired threshold. For example the vegetation cutting device can have more powerful motor which has a greater maximum speed of the motor in trimming mode, but limits the maximum speed of the motor in edging mode in order to keep the noise generated within acceptable limits. Additionally or alternatively the dynamic speed control allows the vegetation cutting device to have a larger cutting swath which is rotated at a slower speed in edging mode.

The vegetation cutting device maximum motor speed is not limited by the noise level the user experiences in the orientation (e.g. edging mode) which generates the greatest level of noise. Instead the vegetation cutting device has a dynamic motor speed control which depends on the orientation of the cutting head. This provides a better cut in trimming mode because the rotary cutting means is driven faster and/or a longer cutting line can be used. The user does not have to worry about manually adjusting the speed of the motor when the string trimmer is modified from operating in the trimming mode to operating in the edging mode.

The switching means may be mechanically mounted between the shaft and the housing. This means that physical movement of shaft with respect to the housing can be detected by the switching means. In some embodiments the switching means may be electrically coupled to the motor and actuation of the switch changes the speed of the motor. Alternatively or additionally, the switching means can be a mechanical solution whereby the switching means is mechanically coupled to the motor. This means that electromechanical parts can automatically control the motor speed when the cutting head is moved from the trimming mode to the edging mode. The electro-mechanical switching also means that the motor can switch between predetermined motor speeds in edging mode and trimming mode to limit the noise level experienced by the user irrespective of the operational mode of the string trimmer. An electro-mechanical solution makes manufacture simpler and cheaper than alternatives such as electronics. Preferably the shaft rotates about a longitudinal axis of the shaft with respect to the housing. The switching means, drive means, power and control wires of the vegetation cutting device may be located within the hollow centre of the shaft. This makes the device more compact and wires and the like do not interfere with the motor and housing when changing between trimming and edging modes.

Preferably the switching means comprises a switch mounted in the housing and an actuating element for actuating the switch mounted on the shaft. Alternatively the switching means may comprise a switch mounted on the shaft and an actuating element for actuating the switch mounted in the housing. In either embodiment the two components of the switching means located on the housing and the shaft can detect relative movement therebetween. The actuating element maybe a camming surface for engaging with a moveable switch element of the switch and for moving the moveable switch element between a first position and a second position. The camming surface may be circumferential or partially circumferential around the shaft.

Preferably the moveable switch element is biased to one of the first position and the second position. This means that the vegetation cutting device is configured to be always biased to a particular motor speed. In some embodiments the moveable switch element is biased to the first position so that the switch will return to the trimming mode top speed.

In some embodiments the cutting head is fixed with respect to one end of the shaft and the housing is rotatably coupled to another end of the shaft. In this way the motor is housed in housing which also comprises first and secondary user grips at generally one end of the vegetation cutting device. The drive shaft extends within the length of the shaft and provides drive to the cutting head. The cutting head is generally at the other end of the device. The cutting head and the shaft will rotate together with respect to the housing when moving between the trimming mode and the edging mode. The switching means can be located closer to the electrical components of the vegetation cutting device and does not interfere with the drive shaft within the shaft. This means that the electrical parts of the device are simpler and manufacture is simpler.

Alternatively the housing may comprise both the cutting head and the motor such that the cutting head and the housing are both rotatably coupled to the shaft. In this case the cutting head and the motor are generally at one end of the device and the user grips are at the other end of the device. Some vegetation cutting devices are more compact and the motor is closer to the rotary cutting means which makes the gearbox and drive shaft elements simpler.

In some embodiments the switching means may be configured to change a voltage supplied to the motor. In this way the motor speed is governed by the voltage level. The switching means may be configured to change between a first circuit arrangement for supplying a first voltage to the motor when the cutting head is in the trimming mode and a second circuit arrangement for supplying a second voltage to the motor when the cutting head is in the edging mode and the first voltage is greater than the second voltage. Indeed, the first circuit arrangement may comprise a first resistance and the second circuit arrangement comprises a second resistance and the first resistance is smaller than the second resistance. For example the first and second circuit arrangements may be identical except for the value of a resistor in the circuits.

Alternatively, the switching means may comprise a rheostat configured to change a resistance value in response to the relative rotational movement of the housing with respect to the shaft. The voltage supplied to the motor will be gradually changed as the shaft is rotated with respect to the housing. In some embodiments the rheostat can comprise a camming surface on the shaft in electrical connection with reciprocating terminals on the housing.

Alternatively the second circuit arrangement comprises a half-wave rectifying circuit and the first circuit arrangement shorts out the half-wave rectifying circuit. Preferably half-wave rectifying circuit comprises a diode. In other embodiments the circuit comprises a pulse width modulation controller configured to change a voltage duty cycle supplied to the motor when the switching means is actuated. Preferably the switch means is configured to be actuated when cutting head is rotated approximately half way between the edging mode and the trimming modes.

BRIEF DESCRIPTION OF THE DRAWINGS

Various other aspects and further embodiments are also described in the following detailed description and in the attached claims with reference to the accompanying drawings, in which:

DETAILED DESCRIPTION OF INVENTION

Figure 1:
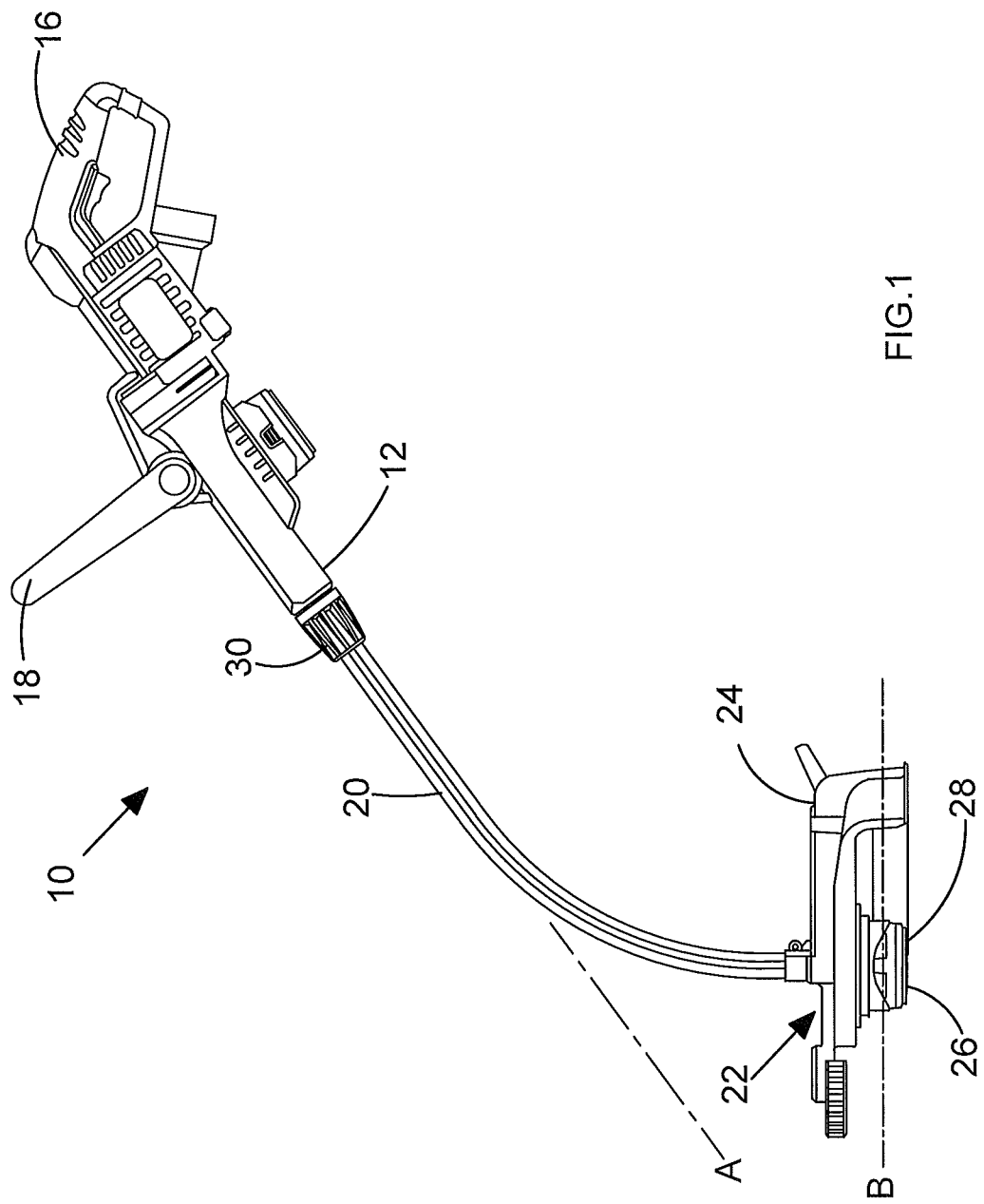
FIG. 1 shows a side view of the vegetation cutting device.

FIG. 1 shows a side view of a vegetation cutting device 10. Typically the vegetation cutting device 10 is a string trimmer, but the vegetation cutting device can alternatively be other devices suitable for cutting vegetation like brush cutters. The vegetation cutting device 10 comprises a housing 12 for housing a motor 14 and other components which will be discussed in further detail with respect to FIG. 3. The housing 12 can comprise two clam shell portions which are fixed together to enclose the motor 14 and other components. The housing 12 has a first gripping handle 16 and a second gripping handle 18 so that the vegetation cutting device 10 can be operated with two hands by a user. The housing 12 is rotatably coupled to a first end of a shaft 20 and a cutting head 22 is fixed to a second end of the shaft 20. The cutting head 22 comprises a guard 24 and a rotary cutting means 26. The rotary cutting means 26 may comprise a flexible line element which is suitable for cutting vegetation. A portion of the flexible line element will protrude from a central cap 28 and define a cutting swath when the rotary cutting means 26 rotates in operation. The flexible line element can be stored on a spool and is dispensed when a portion of the flexible line element protruding from the central cap 28 breaks. In other embodiments the flexible line element can be a fixed length of line. Alternatively the flexible line element can be replaced with blades.

In operation, the cutting swath of the rotary cutting means 26 will generally be in a plane which hereinafter is referred to as a cutting plane B. The vegetation cutting device 10 as shown in FIG. 1 is configured in a trimming mode whereby the cutting plane B of the rotary cutting means 26 is substantially horizontal. This means that in use the cutting plane B will be substantially parallel with the ground or vegetation to be cut.

The shaft 20 can be rotated with respect to the housing 12 to modify the orientation of the cutting head 22. In some embodiments the shaft 20 can be rotated about an axis A which is coaxial with a longitudinal axis of the shaft adjacent to the housing 12 and a longitudinal axis of the housing 12. The shaft 20 can be rotated 180 degrees around the axis A to configure the cutting head 22 in an edging mode.

In edging mode the cutting head 22 is substantially vertical and the cutting plane B of the rotary cutting means 26 is substantially perpendicular with the ground. This means that the edges of a lawn at flowerbeds can be trimmed accurately. Indeed in the edging mode, cutting plane will be perpendicular to cutting plane B as shown in FIG. 1. The shaft 20 can be prevented from rotating with respect to the housing 12 with a locking collar 30. When the user wishes to rotate the shaft 20, the user first unscrews the locking collar 30 and rotates the shaft 20 to the desired position and then retightens the locking collar 30 to fix the shaft 20 in place with respect to the housing.

Figure 2:
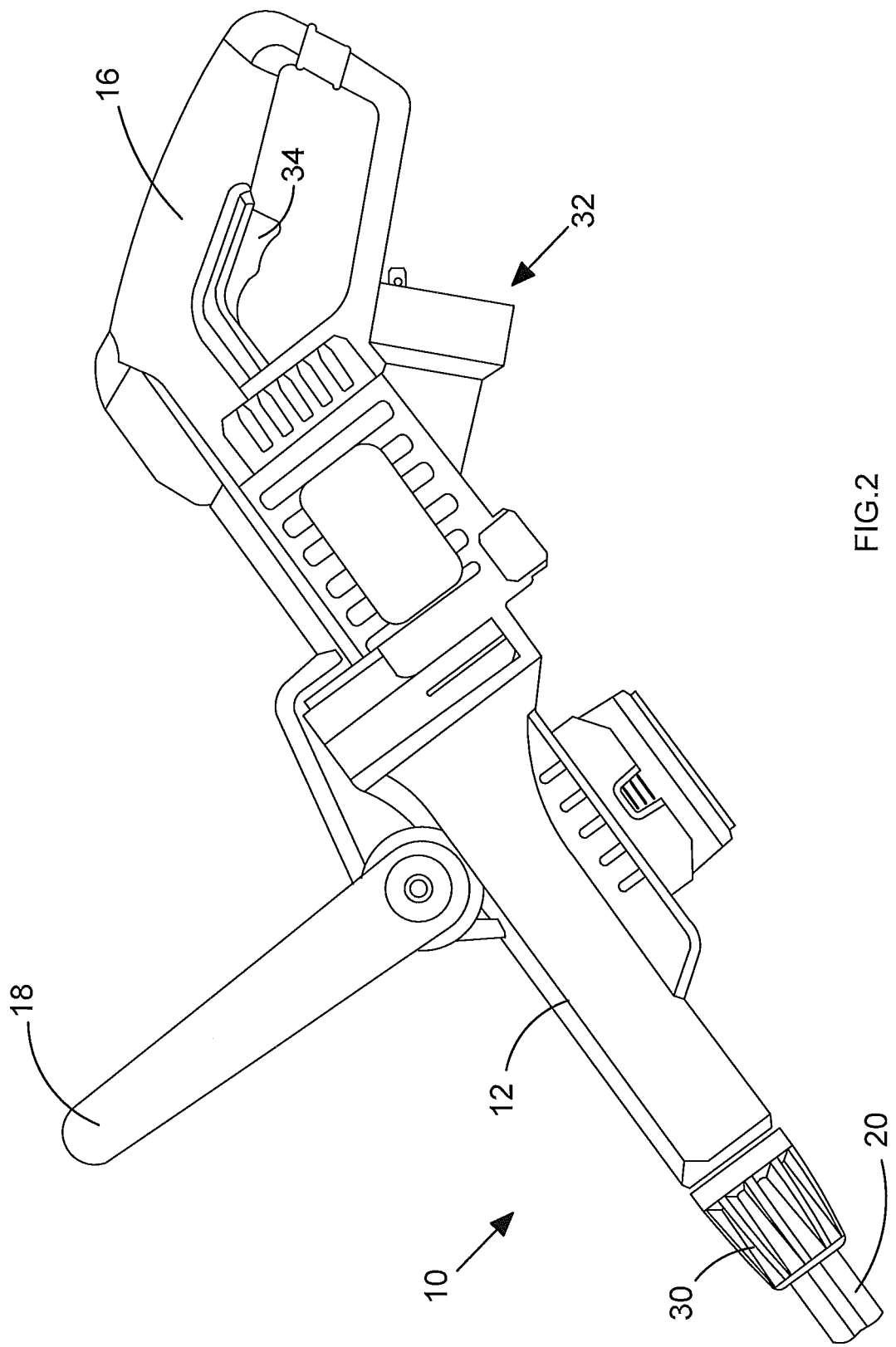
FIG. 2 shows another side view of the vegetation cutting device.

FIG. 2 shows a close up side view of the vegetation cutting device 10 and the housing 12. The vegetation cutting device 10 can be powered by a battery (not shown) or an external AC electricity supply. The battery or external AC electricity supply power cord is coupled to a power input portion 32. The vegetation cutting device 10 can be operated with a user operated trigger 34. Additional secondary triggers (not shown) may also be used in conjunction with the user operated trigger 34 for providing dual switching mechanism so that the vegetation cutting device can only be operated with two hands.

Figure 3:
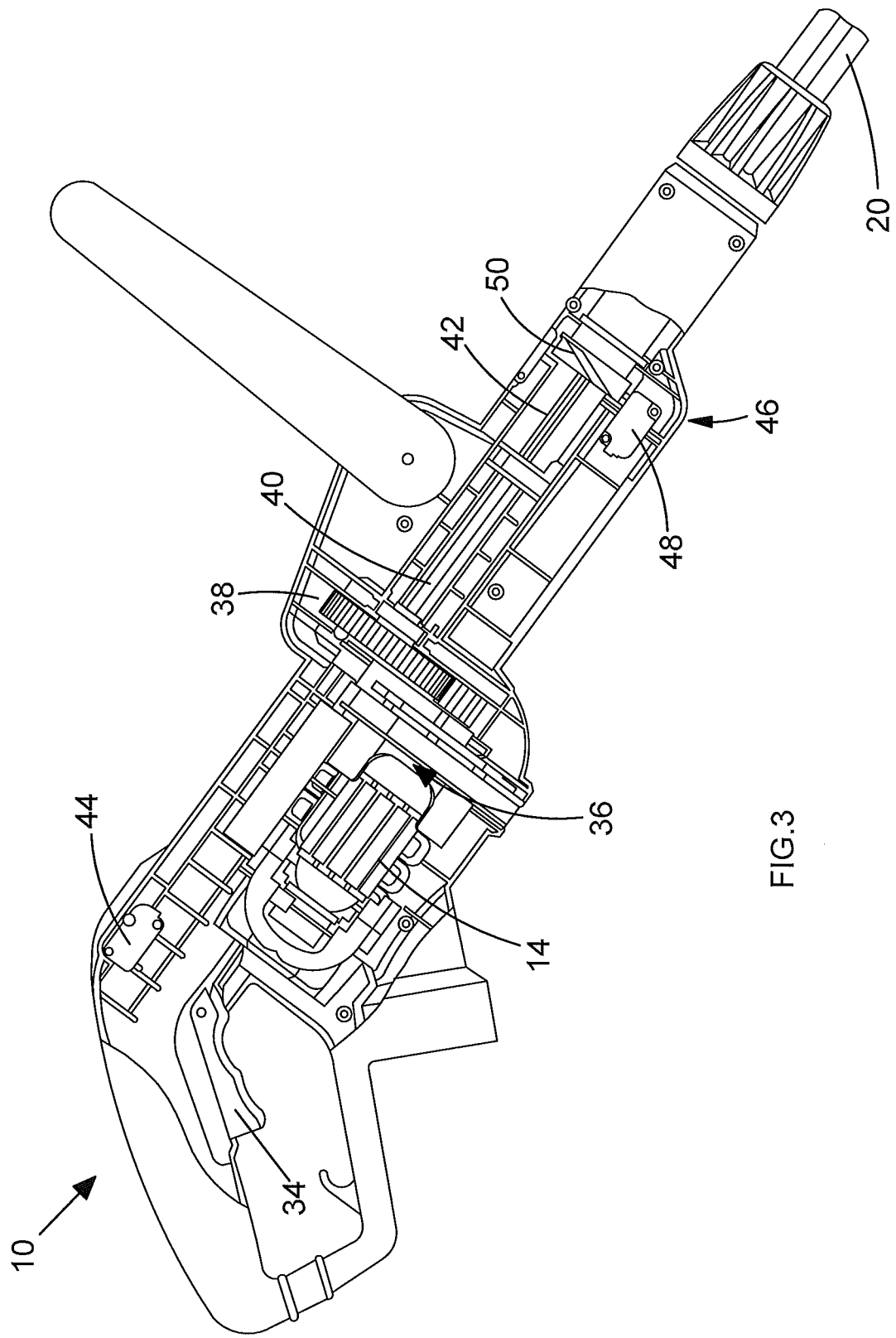
FIG. 3 shows a partial cut away side view of the vegetation cutting device.

FIG. 3 shows a partial cut away of the vegetation cutting device 10 shown in FIG. 2. The motor 14 comprises a motor output drive shaft 36 for driving a gearbox 38. The gearbox 38 comprises a gearing for reducing the rotational speed of the motor output drive shaft 36 to a rotational speed suitable for cutting vegetation. A gearbox output drive shaft 40 is coupled to an extended drive shaft 42 which extends within the shaft 20. The extended drive shaft 42 is coupled to the rotary cutting means 26 in the cutting head 22 and transmits drive from the gearbox 38 to the rotary cutting means 26.

When the user actuates the user operated trigger 34, a trigger switch 44 is actuated and an electrical circuit is completed and a voltage is supplied to the motor 14. The voltage supplied to the motor 14 is determined by switching means 46. Switching means 46 may any means suitable for changing the voltage supplied to the motor 14. In some embodiments switching means 46 comprises a rotation detection switch 48, such as a microswitch, and an actuating element 50. The rotation detection switch 48 is in electrical connection with the motor 14 and may comprise a moveable switch element moveable between a first position and a second position. The actuating element 50 can be a camming surface 50 mounted on the shaft 20. The camming surface 50 may be mounted circumferentially or partially circumferentially. Since the shaft 20 is configured to rotated 180 degrees with respect to the housing 12, the camming surface 50 is mounted around half the shaft 20. Of course, if the shaft 20 is configured to rotated by a different amount, for example a quarter turn, with respect to the housing 12, then the camming surface 50 should be extend a similar amount across the circumference of the shaft 20, e.g. a quarter of the circumference. In other embodiments the switch can be any sensor or switch to detect relative movement between the housing 12 and the shaft 20.

In some embodiments the rotation detection switch 48 is configured to be actuated whilst the cutting head is between the edging mode and the trimming mode. In particular the rotation detection switch 48 is actuated by the camming surface 50 when the cutting head is rotated approximately halfway between the edging mode and the trimming mode. For example the camming surface 50 actuates the rotation detection switch 48 when the shaft 20 has rotated 90 degrees with respect to the housing 12 with a 180 degree relative rotation required to move the cutting head from edging to trimming mode. This means that the rotation detection switch 48 cannot be accidentally actuated whilst the vegetation trimming device 10 is in use.

FIG. 3 shows the vegetation cutting device 10 in the trimming mode. In this mode, the camming surface 50 is not in engagement with the rotational detection switch 48 and the rotational detection switch 48 is in its first position. When the user changes the orientation of the cutting head 22 from trimming mode to edging mode, the shaft 20 rotates with respect to the housing 12. As the shaft 20 rotates, the camming surface 50 engages with the rotation detection switch 48 and moves the rotational detection switch 48 from the first position to the second position and actuates the rotational detection switch 48.

Figure 5:
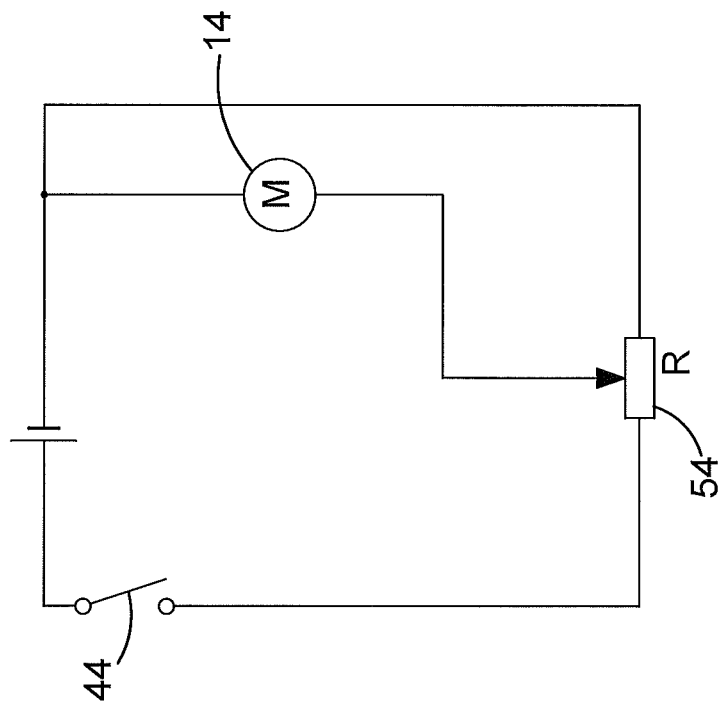
FIGS. 4 and 5 show simplified circuit diagrams for the vegetation cutting device.
Figure 4:
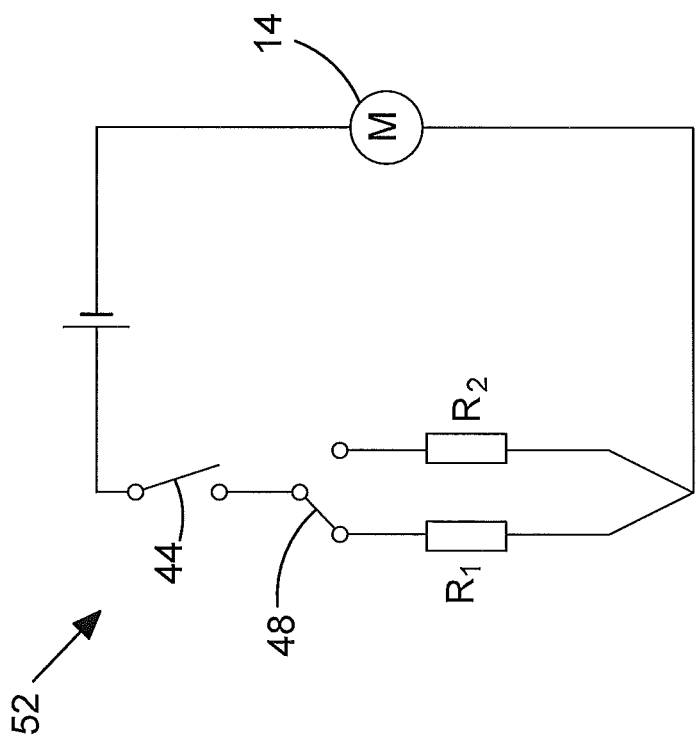

The operation of the switching means 46 will now be discussed in reference to FIGS. 4 and 5. FIGS. 4 and 5 show simplified circuit diagrams of the vegetation cutting device 10 comprising a power supply, the motor 14, the rotational detection switch 48, the trigger switch 44 and one or more resistors. Although FIGS. 4 and 5 show a DC supply, the power supply can be replaced with an AC supply in other embodiments which is discussed in further detail below in reference to FIGS. 8 and 9.

FIG. 4 shows a circuit 52 with a first circuit arrangement and a second circuit arrangement. The first and second circuit arrangements are identical except that a value of a resistor in each circuit arrangement is different. The first circuit arrangement has a first resistor R1 and the second circuit arrangement has a second resistor R2. Whether the first or second circuit arrangement is selected is determined by the status of the rotational detection switch 48. The first circuit arrangement and resistor R1 corresponds to the trimming mode and the second circuit arrangement and resistor R2 corresponds to the edging mode. The first resistor R1 has a lower resistance value than the second resistor R2.

When the trigger switch 44 is actuated, the circuit 52 is completed and a voltage is supplied to the motor 14. As shown in FIG. 4, the vegetation cutting device 10 is in the trimming mode and the rotational detection switch 48 is in the first position and this selects the first circuit arrangement and the first resistor R1. When the shaft 20 is rotated, the camming surface 50 actuates the rotational detection switch 48 and the rotational detection switch 48 moves to the second position and this selects the second circuit arrangement and the second resistor R2 is selected. Since R2 has a greater resistance value than R1, the voltage supplied to the motor in the edging mode will be reduced. This means that the maximum speed of the motor will also be decreased and the noise level when the vegetation cutting device 10 is in the edging mode will be reduced. Conversely the voltage supplied to the motor 14 when the first circuit arrangement and the first resistor R1 is selected will be greater. This means in the trimming mode, the maximum speed of the motor will be greater than in the edging mode. In some embodiments the rotational detection switch 48 is biased to the first position so that the rotational detection switch 48 automatically changes the speed of the motor when the cutting head 22 is rotated back to the trimming mode. In some embodiments there is only one resistor R2 which still provides a difference in voltages between the first circuit arrangement and the second circuit arrangement.

FIG. 5 shows another embodiment whereby the two resistors are replaced with a variable resistor 54. The variable resistor 54 is configured to modify the resistance in the circuit and hence the voltage supplied to the motor 14 when the shaft 20 is rotated. This means that the voltage is supplied to the motor will gradually reduce as the shaft 20 is rotated from trimming mode to the edging mode. In some embodiments, the variable resistor can comprise the camming surface, so that the camming surface is part of the circuit.

Figure 6:
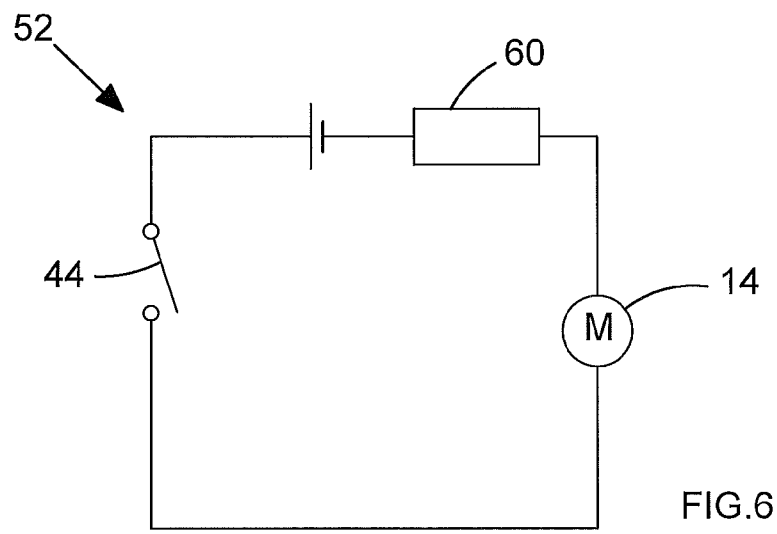
FIG. 6 shows a circuit diagrams for an embodiment of the vegetation cutting device with a DC supply.

An alternative embodiment will now be discussed with reference to FIGS. 6 and 7. FIG. 6 disclose a circuit diagram for varying the speed of the motor with pulse width modulation (PWM). The circuit 52 is a direct current (DC) circuit which comprises a PWM controller 60 configured switch the voltage "ON" periodically according to a duty cycle. The PWM controller 60 comprises a known integrated circuit or electronic components for pulse with modulation of a DC voltage. The PWM controller 60 is configured to vary the duty cycle and the amount of time the voltage is switched "ON" and this controls the voltage supplied to the motor 14. If resistors are used to solely control the voltage, the circuit can overheat and damage the vegetation cutting device. Varying the voltage with pulse width modulation means that heat dissipation is not an issue.

Figure 7:
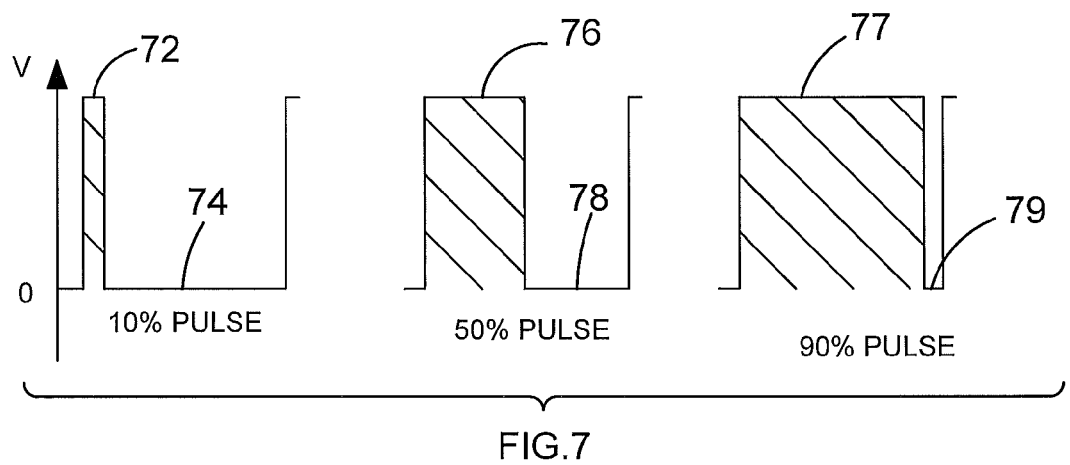
FIG. 7 shows a graphical representation of pulses of different widths in accordance with the embodiment of FIG. 6.

FIG. 7 shows a graphical representation of pulses of different width. The PWM controller 60 can vary the duty cycle and duration that the voltage is "ON" in each the pulse sent to the motor 14. The width of the pulse determines the amount of voltage supplied to the motor and how fast the motor is rotating. The PWM controller 60 can supply a constant voltage or a duty cycle of 100% to the motor and in this case the motor will be operating at full speed. When the motor speed is reduced, the PWM controller adjusts the duty cycle and reduces the duration of ON pulses.

FIG. 7 shows three examples ON pulses 72, 76, 77 for different duty cycles. For example the PWM controller 60 control the circuit with a duty cycle having a 10% pulse width 72, a 50% pulse width 76 or a 90% pulse width. For comparison each pulse 72, 76, 77 has a respective "OFF" period. This means that the speed of the motor 14 can be adjusted to a variety of speeds with the PWM controller 60. The PWM controller 60 changes the pulse width in response to the rotation detection switch 48 actuating in response to relative rotation between the shaft 20 and the housing 12. This is similar to the previously discussed embodiments. The PWM controller 60 can control the pulse widths such that the full width (100% duty cycle) maximum voltage is across the motor 14 in trimming mode and a reduced width pulse (e.g. 50%) is across the motor 14 edging mode. Alternatively the PWM controller 60 can be configured to supply a plurality of different pulse widths to the motor 14. Momentum and inertia of the rotating motor 14 means that the motor 14 continues to rotate even in the periods when no voltage is supplied.

Figure 8:
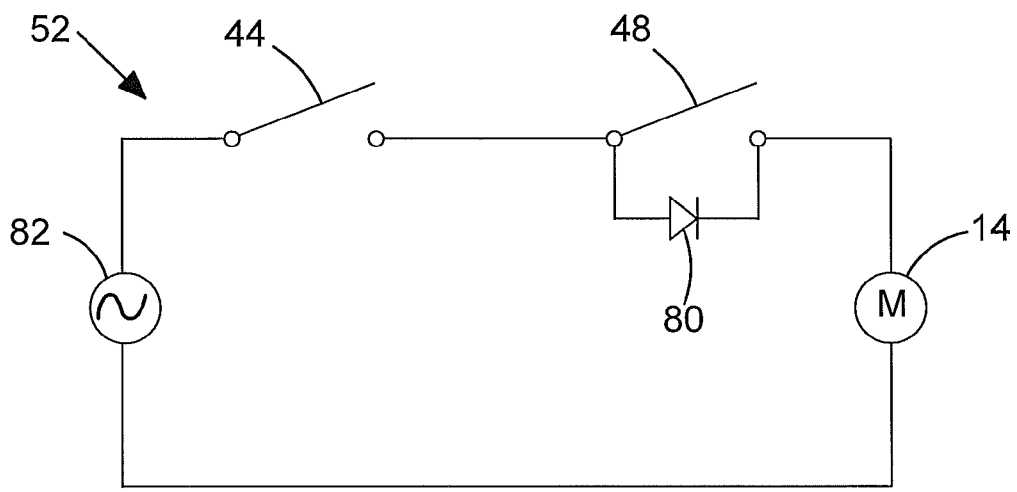
FIGS. 8 and 9 shows circuit diagrams for embodiments of the vegetation cutting device with an AC supply.

As previously mentioned, the vegetation cutting device 10 can be operated with an alternating current supply. This alternative embodiment will now be discussed with reference to FIGS. 8 and 9. FIG. 8 shows a circuit diagram for controlling the speed of a motor 14 in a vegetation cutting device 10 with an AC supply 82. Similar to the embodiment discussed with reference to FIG. 4, the circuit 52 comprises a trigger switch 44 and a rotation detection switch 48. The circuit 52 comprises a diode 80 for providing a half-wave rectifying circuit. When the rotation detection switch 48 is closed, the diode 80 is no longer selected or "shorted out" from the circuit 52 and the full voltage is supplied across the motor 14. The half-wave rectifying circuit means that when the rotation detection switch 48 is open, the diode 82 removes one half of the sinusoidal AC voltage supply 82. The diode 82 reduces the root mean square voltage across the motor 14 and the speed of the motor 14 is reduced. Momentum and inertia of the rotating motor 14 means that the motor 14 continues to rotate even in the periods when no voltage is supplied.

Figure 9:
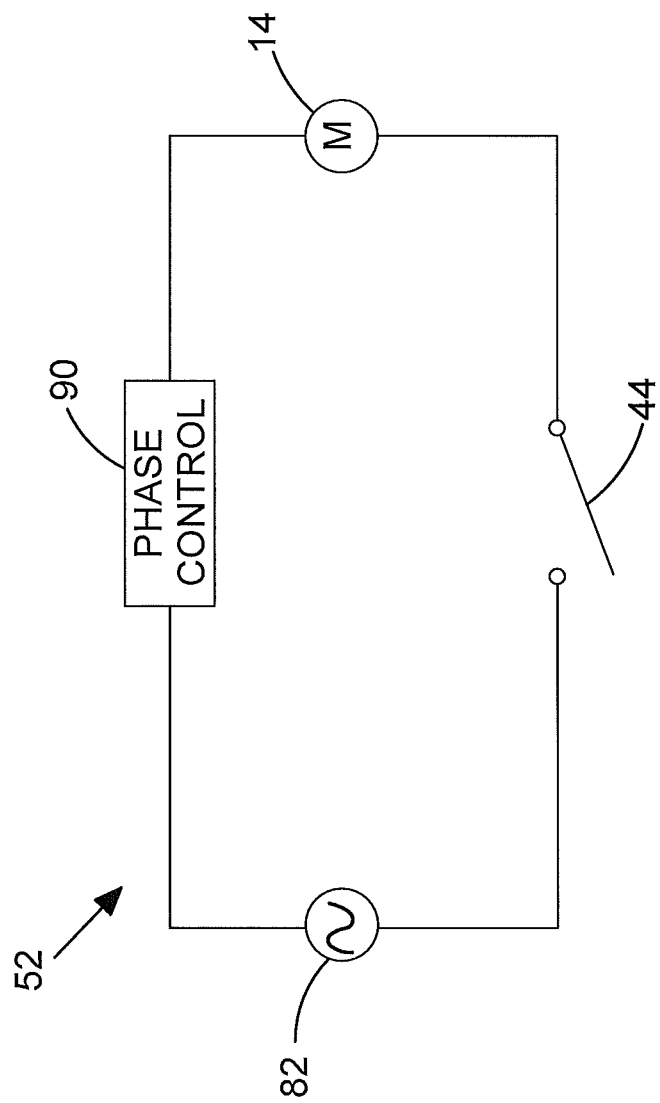

Alternatively the circuit 52 can comprise a phase control module 90 for controlling the voltage supplied to the motor as shown in FIG. 9. The phase control module 90 can comprise a thyristor or triac circuit for continuous speed control of the motor 14 over a range of speeds. Alternatively the phase control module 90 can comprise a series of stepped predetermined speeds using multiple taps on the field coil of the motor 14.

In other embodiments, the switching means mechanically changes the speed of the rotary cutting means 26 by changing the gearing in the gearbox 38. In this way a first gearing is used in the trimming mode and a second gearing is used in the edging mode such that the speed of the rotary cutting means is faster in the trimming mode.

Embodiments of the present invention have been discussed with particular reference to the examples illustrated. However it will be appreciated that variations and modifications may be made to the examples described within the scope of the invention. Further embodiments are disclosed wherein one or more embodiments are combined. Other embodiments are disclosed wherein one or more features of one embodiment are combined with another embodiment.

The invention claimed is:

1. A vegetation cutting device comprising:
    a housing rotatably coupled to a shaft;
    a cutting head comprising a rotary cutting means for cutting vegetation, the cutting head being coupled to the shaft and being arranged to move between an edging mode in which the rotary cutting means rotates in a substantially vertical plane and a trimming mode in which the rotary cutting means rotates in a substantially horizontal plane;
    a motor mounted in the housing, the motor being arranged to drive the rotary cutting means; and
    a switching means mechanically coupled between the housing and the shaft and arranged to be actuated when the shaft rotates relative to the housing thereby changing the speed of the rotary cutting means when the cutting head moves between the edging mode and trimming mode; and
    wherein the switching means comprises a switch mounted on one of the housing or the shaft and an actuating element for actuating the switch mounted on the other of the housing or the shaft.

2. The vegetation cutting device according to claim 1 wherein the shaft rotates about a longitudinal axis of the shaft with respect to the housing.

3. The vegetation cutting device according to claim 1 wherein the actuating element is a camming surface for engaging with a moveable switch element of the switch and for moving the moveable switch element between a first position and a second position.

4. The vegetation cutting device according to claim 3 wherein the moveable switch element is biased to one of the first position and the second position.

5. The vegetation cutting device according to claim 1 wherein the cutting head is fixed with respect to one end of the shaft and the housing is rotatably coupled to another end of the shaft.

6. The vegetation cutting device according to claim 1 wherein the switching means is configured to change a voltage supplied to the motor and change the speed of the motor.

7. The vegetation cutting device according to claim 6 wherein the switching means is configured to change between a first circuit arrangement for supplying a first voltage to the motor when the cutting head is in the trimming mode and a second circuit arrangement for supplying a second voltage to the motor when the cutting head is in the edging mode and the first voltage is greater than the second voltage.

8. The vegetation cutting device according to claim 7 wherein the second circuit arrangement comprises a half-wave rectifying circuit and the first circuit arrangement shorts out the half-wave rectifying circuit.

9. The vegetation cutting device according to claim 8 wherein half-wave rectifying circuit comprises a diode.

10. The vegetation cutting device according to claim 6 wherein the switching means comprises a pulse width modulation controller configured to change a voltage duty cycle supplied to the motor when the switching means is actuated.

11. The vegetation cutting device according to claim 1 wherein the switching means is configured to be actuated when cutting head is rotated approximately half way between the edging mode and the trimming modes.

12. A vegetation cutting device comprising:
    a housing;
    a cutting head comprising a rotary cutting element for cutting vegetation;
    a shaft coupling the cutting head to the housing, the cutting head being arranged to move between an edging mode in which the rotary cutting element rotates in a substantially vertical plane and a trimming mode in which the rotary cutting element rotates in a substantially horizontal plane;
    a motor being arranged to drive the rotary cutting element; and
    a switch for detecting whether the cutting head is in the edging mode or the cutting mode, and operating the motor at a first speed in the edging mode and a second speed when in the trimming mode.

13. The vegetation cutting device of claim 12, wherein movement of the cutting head between the edging mode and the trimming mode automatically actuates the switch to change the speed of the motor.

14. The vegetation cutting device of claim 12, wherein the first speed is lesser than the second speed.

15. The vegetation cutting device of claim 12, wherein the rotation of the cutting head between the edging mode and trimming mode moves a cammed surface to actuate the switch.

16. A method of changing the motor speed of a vegetation cutting device comprising the steps of:
    providing the vegetation cutting device of claim 1;
    moving the cutting head from the trimming mode to the edging mode, wherein the movement of the cutting head actuates the switching means for changing the motor speed.

* * * * *